United States Patent
Higuchi (10) Patent No.: US 10,671,103 B2
(45) Date of Patent: Jun. 2, 2020

(54) VOLTAGE SUPPLY APPARATUS

(71) Applicant: NGK SPARK PLUG CO., LTD., Nagoya-shi, Aichi (JP)

(72) Inventor: Yuzo Higuchi, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 191 days.

(21) Appl. No.: 15/914,321

(22) Filed: Mar. 7, 2018

(65) Prior Publication Data
US 2018/0275701 A1 Sep. 27, 2018

(30) Foreign Application Priority Data
Mar. 23, 2017 (JP) ................. 2017-057329

(51) Int. Cl.
*G05F 1/46* (2006.01)
*H02M 3/04* (2006.01)

(52) U.S. Cl.
CPC ................ *G05F 1/46* (2013.01); *H02M 3/04* (2013.01)

(58) Field of Classification Search
CPC .... G05F 1/00; G05F 1/10; G05F 1/46; H02M 3/00; H02M 3/02; H02M 3/04

USPC ........................................................ 307/104
See application file for complete search history.

(56) References Cited

FOREIGN PATENT DOCUMENTS

JP 2001-296140 A 10/2001

*Primary Examiner* — Hal Kaplan
(74) *Attorney, Agent, or Firm* — Sughrue Mion, PLLC (57) ABSTRACT

A voltage supply apparatus for supplying a voltage to a detection circuit, including a power supply filter (4) and a control section (5) which supply a sensor drive voltage Vbg to a sensor device (2) having a ratiometric characteristic. The power supply filter (4) has supply paths PL1 and PL2. The control section (5) determines whether or not a switching determination time has elapsed after startup. In the case where the switching determination time has not yet elapsed, the power supply filter (4) supplies the sensor drive voltage Vbg through supply path PL1. In the case where the switching determination time has elapsed, the power supply filter (4) supplies the sensor drive voltage Vbg through supply path PL2. The response of the sensor drive voltage Vbg to a variation in power supply voltage Vcc is slower when supplied through the supply path PL2 than through the supply path PL1.

4 Claims, 6 Drawing Sheets

VOLTAGE SUPPLY APPARATUS

BACKGROUND OF THE INVENTION

1. Field of the Invention

The present disclosure relates to a voltage supply apparatus which supplies a voltage to a detection circuit having a ratiometric characteristic.

2. Description of the Related Art

As disclosed in Patent Document 1, a system has been known in which the voltage value of an analog signal output from a sensor is converted to a digital signal by an AD conversion circuit provided in an electronic controller.

The AD conversion circuit provided in the electronic controller converts the voltage value of the analog signal output from a sensor to the digital signal while using, as a reference, a reference voltage generated by, for example, a regulator within the electronic controller. Therefore, even in the case where the sensor continuously outputs an analog signal having a constant voltage value, if the reference voltage varies, the value of the digital signal converted from the analog signal varies accordingly.

Conventionally, a technique for avoiding the influence of such a variation has been used. According to this technique, the reference voltage supplied to the AD conversion circuit is also supplied to the sensor so that the voltage value of the analog signal from the sensor varies in proportion to the variation in the reference voltage, whereby the influence of the variation in the reference voltage can be cancelled out.

[Patent Document 1] Japanese Patent Application Laid-Open (kokai) No. 2001-296140

3. Problems to be Solved by the Invention

Since the electronic controller is disposed at a location remote from the sensor, if noise enters a supply path which supplies the reference voltage from the electronic controller to the sensor, the noise is superimposed on the reference voltage supplied to the sensor, and the noise is also superimposed on the analog signal output from the sensor. As a result, the detection accuracy of the sensor deteriorates.

In order to solve such a problem, a noise elimination filter is generally provided in the supply path for supplying the reference voltage. However, a problem has occurred in that the noise elimination filter provided in the supply path produces a delay in the reference voltage which is supplied to the sensor when power is applied to the electronic controller, thereby lengthening the time required to bring the sensor into a detectable state.

SUMMARY OF THE INVENTION

It is therefore an object of the present disclosure to provide a voltage supply apparatus which prevents a decrease in detection accuracy and which prevents a lengthening of the time until detection becomes possible.

The above object of the present disclosure has been achieved by providing (1) a voltage supply apparatus for supplying a voltage to a detection circuit. The detection circuit detects a state quantity to be detected and outputs, as a detection signal, a signal having a voltage corresponding to the detected state quantity. The detection circuit has a ratiometric characteristic such that the voltage of the detection signal varies in proportion to a drive voltage supplied to the detection circuit so as to drive the detection circuit.

The voltage supply apparatus of the present disclosure comprises a first supply path, a second supply path, a stability determination section, a first supply section, and a second supply section.

The first supply path supplies the drive voltage to the detection circuit. The second supply path is a path different from the first supply path and supplies the drive voltage to the detection circuit.

The stability determination section determines whether or not a stability determination condition is satisfied, the stability determination condition being set in advance and when satisfied indicating that supply of the drive voltage to the detection circuit is stable. The first supply section supplies the drive voltage to the detection circuit through the first supply path when the stability determination section determines that the stability determination condition is not satisfied but not when the stability determination condition is satisfied. The second supply section supplies the drive voltage to the detection circuit through the second supply path when the stability determination section determines that the stability determination condition is satisfied but not when the stability determination condition is not satisfied.

The response of the drive voltage to a voltage variation is slower when supplied through the second supply path than through the first supply path.

The voltage supply apparatus of the present disclosure configured as described above supplies the drive voltage to the detection circuit through the first supply path in a situation where the supply of the drive voltage to the detection circuit is unstable, such as immediately after supply of the drive voltage to the detection circuit has been started. The first supply path has a faster response to voltage variation than the second supply path. Therefore, the voltage supply apparatus of the present disclosure can prevent the occurrence of a situation where supply of the drive voltage to the detection circuit is delayed immediately after supply of the drive voltage to the detection circuit has been started, to thereby prevent a lengthening of the time until detection by the detection circuit becomes possible.

Further, the voltage supply apparatus of the present disclosure supplies the drive voltage to the detection circuit through the second supply path in a situation where the supply of the drive voltage to the detection circuit is stable. The second supply path has a slower response to a voltage variation than the first supply path. Therefore, in the case where noise enters the second supply path, the voltage supply apparatus of the present disclosure can prevent superimposition of the noise on the drive voltage supplied to the detection circuit, thereby preventing a decrease in detection accuracy of the detection circuit.

As described above, the voltage supply apparatus of the present disclosure can prevent a decrease in the detection accuracy of the detection circuit and can prevent a lengthening of the time until the detection circuit enters a detection performable state. Notably, the term "state quantity" used in the present disclosure refers to a physical quantity to be detected, such as temperature or flow rate, or a chemical quantity to be detected such as gas concentration.

In a preferred embodiment (2) of the voltage supply apparatus (1) above, the first supply path and the second supply path are connected to a ratiometric element. The ratiometric element is a component which is one of a plurality of components of a signal processing circuit for processing the detection signal output from the detection circuit and which outputs a signal whose voltage varies in proportion to the drive voltage.

In the voltage supply apparatus of the present disclosure, the first supply section supplies the drive voltage to the ratiometric element through the first supply path when the stability determination section determines that the stability determination condition is not satisfied. In the voltage supply apparatus of the present disclosure, the second supply section supplies the drive voltage to the ratiometric element through the second supply path when the stability determination section determines that the stability determination condition is satisfied.

The voltage supply apparatus of the present disclosure configured as described above supplies the drive voltage to the ratiometric element of the signal processing circuit in the same manner as the drive voltage is supplied to the detection circuit. Therefore, the voltage supply apparatus of the present disclosure can prevent a decrease in detection accuracy and prevent a lengthening of the time until detection becomes possible.

In another preferred embodiment (3) of the voltage supply apparatus (1) or (2) above, the stability determination condition is an elapse of a previously set stability determination time after startup of the voltage supply apparatus. In yet another preferred embodiment (4) of the voltage supply apparatus (1) or (2) above, the stability determination condition is a condition wherein the drive voltage is equal to or greater than a previously set stability determination voltage.

The voltage supply apparatus of the present disclosure configured as described above can determine whether or not the stability determination condition is satisfied, by means of a simple method. Therefore, the processing load of the voltage supply apparatus can be reduced.

DESCRIPTION OF REFERENCE NUMERALS

Reference numerals used to identify various features in the drawings include the following.

2 . . . sensor device; 3 . . . sensor circuit; 4 . . . power supply filter; 5 . . . control section; PL1, PL2, PL3, PL4, PL5, PL6, PL11, PL12, PL13, PL14 . . . supply path

DETAILED DESCRIPTION OF THE PREFERRED EMBODIMENTS

First though sixth exemplary embodiments of the present disclosure will next be described with reference to the drawings. However, the present invention should not be construed as being limited thereto.

(First Embodiment)

A first embodiment of the present disclosure will now be described with reference to the drawings.

Figure 1:
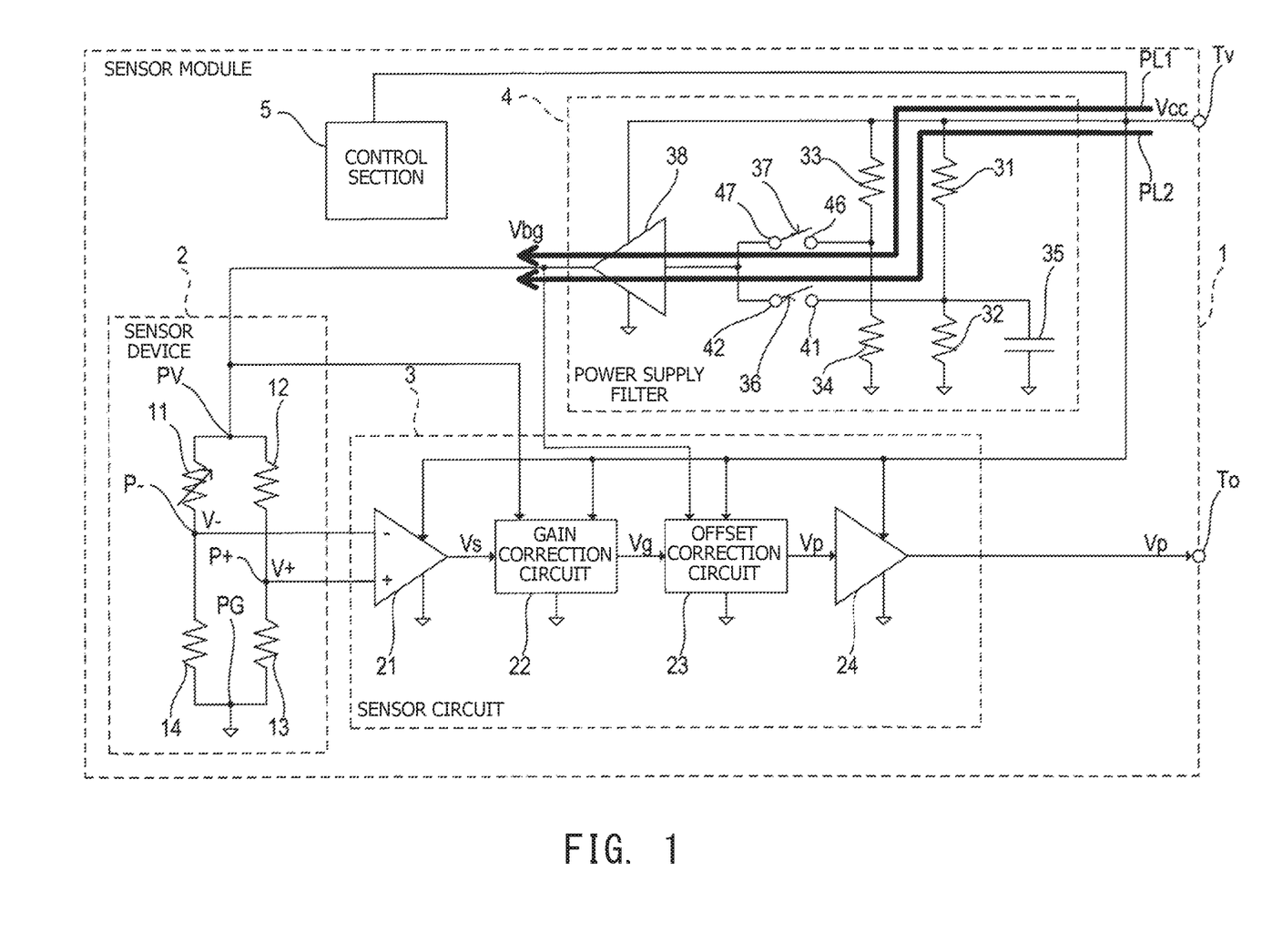
FIG. 1 is a circuit diagram showing the configuration of a sensor module 1 of a first embodiment.

As shown in FIG. 1, a sensor module 1 of the present embodiment includes a sensor device 2, a sensor circuit 3, a power supply filter 4, and a control section 5.

The sensor device 2 is a Wheatstone bridge circuit including a heat-sensitive resistor 11, a first fixed resistor 12, a second fixed resistor 13, and a third fixed resistor 14.

The heat-sensitive resistor 11 is a resistor whose resistance changes with its own temperature change, and an example of the heat-sensitive resistor 11 is a platinum resistor.

One end of the heat-sensitive resistor 11 is connected to the first fixed resistor 12, and the other end of the heat-sensitive resistor 11 is connected to the third fixed resistor 14. In the following description, the connection point between the heat-sensitive resistor 11 and the first fixed resistor 12 will be referred to as a connection point PV, and the connection point between the heat-sensitive resistor 11 and the third fixed resistor 14 will be referred to as a connection point P−.

An end of the first fixed resistor 12, which end is not connected to the heat-sensitive resistor 11, is connected to the second fixed resistor 13. In the following description, the connection point between the first fixed resistor 12 and the second fixed resistor 13 will be referred to as a connection point P+.

An end of the second fixed resistor 13, which end is not connected to the first fixed resistor 12, is connected to an end of the third fixed resistor 14, which end is not connected to the heat-sensitive resistor 11. In the following description, the connection point between the second fixed resistor 13 and third fixed resistor 14 will be referred as a connection point PG.

The connection point PV is connected to the power supply filter 4, so that a sensor drive voltage Vbg is applied thereto through the power supply filter 4. The connection point PG is grounded.

The sensor circuit 3 includes an operational amplifier 21, a gain correction circuit 22, an offset correction circuit 23, and a buffer 24. The operational amplifier 21, the gain correction circuit 22, the offset correction circuit 23, and the buffer 24 operate through use of a power supply voltage Vcc supplied thereto through a power supply terminal Tv. In the present embodiment, the power supply voltage Vcc is 5 V.

The operational amplifier 21 forms a differential amplification circuit, and outputs from its output terminal a voltage corresponding to the difference between a voltage input from the non-inverting input terminal of the operational amplifier 21 and a voltage input from the inverting input terminal of the operational amplifier 21.

The non-inverting input terminal and the inverting input terminal of the operational amplifier 21 are connected to the connection point P+ and the connection point P−, respectively, of the sensor device 2. Accordingly, a sensor signal Vs whose voltage is proportional to the difference $(V_+ - V_-)$ is output from the output terminal of the operational amplifier 21.

The gain correction circuit 22 is a circuit which can correct the degree of amplification of the sensor signal Vs amplified by the operational amplifier 21 and in which an amplification factor K is set so as to correct the degree of amplification in advance, in consideration of the type of the heat-sensitive resistor 11 and/or a variation among individual heat-sensitive resistors.

The gain correction circuit 22 outputs an amplified signal Vg whose voltage is determined by multiplying the voltage of the sensor signal Vs by the amplification factor K.

The offset correction circuit 23 receives the sensor drive voltage Vbg from the power supply filter 4 and computes an offset voltage Voff in accordance with the following equation (1) by using the received sensor drive voltage Vbg and a coefficient d set in advance.

$$Voff = d \times Vbg \quad (1)$$

The offset correction circuit 23 outputs a temperature signal Vp whose voltage is determined by adding the offset voltage Voff to the voltage of the amplified signal Vg.

The buffer 24 is a circuit for impedance conversion. The input terminal of the buffer 24 is connected to the offset correction circuit 23, and the output terminal of the buffer 24 is connected to the output terminal To of the sensor module 1. Thus, the sensor circuit 3 outputs the temperature signal Vp from the output terminal To.

The power supply filter 4 includes resistors 31, 32, 33, and 34, a capacitor 35, switches 36 and 37, and a buffer 38.

The resistances of the resistors 31, 32, 33, and 34 of the present embodiment are 50 kΩ, 200 kΩ, 50 kΩ, and 200 kΩ, respectively. The capacitance of the capacitor 35 of the present embodiment is 0.33 μF.

One end of the resistor 31 is connected to the power supply terminal Tv of the sensor module 1, and the other end of the resistor 31 is connected to the resistor 32. An end of the resistor 32, which end is not connected to the resistor 31, is grounded.

One end of the resistor 33 is connected to the power supply terminal Tv, and the other end of the resistor 33 is connected to the resistor 34. An end of the resistor 34, which end is not connected to the resistor 33, is grounded.

One end of the capacitor 35 is connected to the connection point between the resistor 31 and the resistor 32, and the other end of the capacitor 35 is grounded.

The switch 36 has connection terminals 41 and 42. The connection terminal 41 is connected to the connection point between the resistor 31 and the resistor 32, and the connection terminal 42 is connected to the input terminal of the buffer 38. In accordance with a switching signal output from the control section 5, the switch 36 is switched to either of an ON state in which the connection terminal 41 and the connection terminal 42 are connected and an OFF state in which the connection terminal 41 and the connection terminal 42 are not connected.

The switch 37 has connection terminals 46 and 47. The connection terminal 46 is connected to the connection point between the resistor 33 and the resistor 34, and the connection terminal 47 is connected to the input terminal of the buffer 38. In accordance with a switching signal output from the control section 5, the switch 37 is switched to either of an ON state in which the connection terminal 46 and the connection terminal 47 are connected and an OFF state in which the connection terminal 46 and the connection terminal 47 are not connected.

The buffer 38 is a circuit for impedance conversion. As described above, the input terminal of the buffer 38 is connected to the switches 36 and 37, and the output terminal of the buffer 38 is connected to the sensor device 2 and the offset correction circuit 23 of the sensor circuit 3.

In the power supply filter 4 configured as described above, when the switch 36 is in the OFF state and the switch 37 is in the ON state, the sensor drive voltage Vbg is supplied to the sensor device 2 through a supply path PL1 extending from the power supply terminal Tv through the resistor 33, the switch 37, and the buffer 38. The sensor drive voltage Vbg has a voltage value obtained by dividing the power supply voltage Vcc by the resistor 33 and the resistor 34. Since the resistances of the resistors 33 and 34 are 50 kΩ and 200 kΩ, respectively, as described above, the sensor drive voltage Vbg is 4 V.

Meanwhile, in the case where the switch 36 is in the ON state and the switch 37 is the OFF state, the sensor drive voltage Vbg is supplied to the sensor device 2 through a supply path PL2 extending from the power supply terminal Tv through the resistor 31, the switch 36, and the buffer 38. Since the resistances of the resistors 31 and 32 are 50 kΩ and 200 kΩ, respectively, as described above, the sensor drive voltage Vbg is 4 V. A low-pass filter formed by the resistor 31 and the capacitor 35 is provided in the supply path PL2. Therefore, the sensor drive voltage Vbg output from the power supply filter 4 through the supply path PL2 has a characteristic determined by the low-pass filter whose cut-off frequency is $1/(2\pi RC)$, where R is the resistance of the resistor 31, and C is the capacitance of the capacitor 35. Also, the response of the sensor drive voltage Vbg, which is output from the power supply filter 4 through the supply path PL2, to a change in the power supply voltage Vcc, is delayed in accordance with the time constant of the low-pass filter formed by the resistor 31 and the capacitor 35.

The control section 5 is mainly composed of a well-known microcomputer which includes a CPU, a ROM, a RAM, I/O devices, a bus line for connecting these components, etc. The control section 5 operates through use of the power supply voltage Vcc supplied thereto through the power supply terminal Tv.

The various functions of the microcomputer are realized by a program which is stored in a nonvolatile memory and executed by the CPU. In this example, the ROM corresponds to the nonvolatile memory storing the program. Also, a method corresponding to the program is performed as a result of execution of this program. Notably, the control section 5 may include a single microcomputer or a plurality of microcomputers. Also, some or all of the functions of the microcomputer(s) may be implemented by hardware; for example, by a single IC or a plurality of ICs.

The control section 5 executes a switching process.

Figure 2:
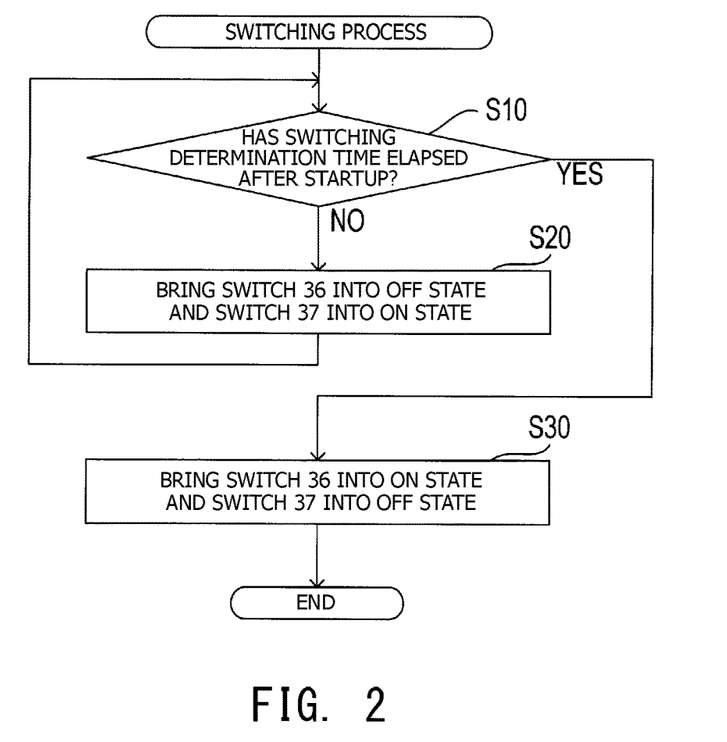
FIG. 2 is a flowchart showing a switching process of the first embodiment.

Here, the steps of the switching process will be described. The control section 5 starts this switching process immediately after the microcomputer of the control section 5 starts its operation upon supply of the power supply voltage Vcc thereto.

In this switching process, as shown in FIG. 2, the control section 5 first determines in S10 whether or not a switching determination time (for example, 0.1 sec) set in advance has elapsed after the startup of the microcomputer. In the case where the control section 5 determines that the switching determination time has not yet elapsed, in S20, the control section 5 outputs to the switch 36 a first switching signal for instructing the switch 36 to enter the OFF state and outputs to the switch 37 a second switching signal for instructing the switch 37 to enter the ON state. Subsequently, the control section 5 proceeds to S10.

Meanwhile, in the case where the control section 5 determines that the switching determination time has elapsed, in S30, the control section 5 outputs to the switch 36 the first switching signal for instructing the switch 36 to enter the ON state and outputs to the switch 37 the second switching signal for instructing the switch 37 to enter the OFF state. Subsequently, the control section 5 ends the switching process.

The power supply filter 4 and the control section 5 configured as described above supply the sensor drive voltage Vbg to the sensor device 2. The sensor device 2 outputs, as a detection signal, signals having the voltages V+ and V− corresponding to the detection results. The sensor device 2 has a ratiometric characteristic; i.e., the voltage of the detection signal varies in proportion to the sensor drive voltage Vbg.

The power supply filter 4 has the supply path PL1 and the supply path PL2. The supply path PL1 supplies the sensor drive voltage Vbg to the sensor device 2. The supply path PL2 is a path different from the supply path PL1 and supplies the sensor drive voltage Vbg to the sensor device 2.

The control section 5 determines whether or not the switching determination time has elapsed after the startup of the microcomputer. In the case where the control section 5 determines that the switching determination time has not yet elapsed, the power supply filter 4 supplies the sensor drive voltage Vbg to the sensor device 2 through the supply path PL1. In the case where the control section 5 determines that the switching determination time has elapsed, the power supply filter 4 supplies the sensor drive voltage Vbg to the sensor device 2 through the supply path PL2.

The response of the sensor drive voltage Vbg to a variation in the power supply voltage Vcc is slower when supplied through the supply path PL2 than through the supply path PL1.

As described above, the power supply filter 4 and the control section 5 supply the sensor drive voltage Vbg to the sensor device 2 through the supply path PL1 in a situation where the supply of the sensor drive voltage Vbg to the sensor device 2 is unstable, for example, immediately after supply of the sensor drive voltage Vbg to the sensor device 2 has been started. The response of the sensor drive voltage Vbg to a variation in the power supply voltage Vcc is faster when supplied through the supply path PL1 than through the supply path PL2. Therefore, the power supply filter 4 and the control section 5 can prevent the occurrence of a situation where supply of the sensor drive voltage Vbg to the sensor device 2 is delayed immediately after supply of the sensor drive voltage Vbg to the sensor device 2 has been started, to thereby prevent a lengthening of the time until detection by the sensor device 2 becomes possible.

Further, the power supply filter 4 and the control section 5 supply the sensor drive voltage Vbg to the sensor device 2 through the supply path PL2 in the situation where supply of the sensor drive voltage Vbg to the sensor device 2 is stable. The response of the sensor drive voltage Vbg to a variation in the power supply voltage Vcc is slower when supplied through the supply path PL2 than through the supply path PL1. Therefore, in the case where noise enters the supply path PL2, the power supply filter 4 and the control section 5 can prevent superimposition of the noise on the sensor drive voltage Vbg supplied to the sensor device 2, thereby preventing a decrease in the detection accuracy of the sensor device 2.

As described above, the power supply filter 4 and the control section 5 can prevent a decrease in detection accuracy of the sensor device 2, and can prevent a lengthening of the time until the sensor device 2 enters a detection performable state.

The offset correction circuit 23 is a component which is one of the plurality of components of the sensor circuit 3 for processing the detection signal output from the sensor device 2, and which outputs a signal whose voltage varies in proportion to the sensor drive voltage Vbg. The supply path PL1 and the supply path PL2 are connected to the offset correction circuit 23.

In the case where the control section 5 determines that the switching determination time has not yet elapsed, the power supply filter 4 supplies the sensor drive voltage Vbg to the offset correction circuit 23 through the supply path PL1. In the case where the control section 5 determines that the switching determination time has elapsed, the power supply filter 4 supplies the sensor drive voltage Vbg to the offset correction circuit 23 through the supply path PL2.

As described above, the power supply filter 4 and the control section 5 supply the sensor drive voltage Vbg to the offset correction circuit 23 of the sensor circuit 3 in the same manner as the sensor drive voltage Vbg is supplied to the sensor device 2. Therefore, it is possible to prevent a decrease in detection accuracy and prevent a lengthening of the time until detection becomes possible.

Also, the control section 5 can determine whether or not the supply of the sensor drive voltage Vbg to the sensor device 2 is stable by a simple method of determining whether or not the switching determination time has elapsed after startup of the microcomputer. Therefore, the processing load of the control section 5 can be reduced.

Notably, the power supply filter 4 and the control section 5 correspond to the voltage supply apparatus; the sensor device 2 corresponds to the detection circuit; the supply path PL1 corresponds to the first supply path in the claims; and the supply path PL2 corresponds to the second supply path in the claims appended hereto.

S10 corresponds to the process carried out by the stability determination section; S20 corresponds to the process carried out by the first supply section; and S30 corresponds to the process carried out by the second supply section in the claims appended hereto.

The temperature corresponds to the state quantity; the sensor drive voltage Vbg corresponds to the drive voltage; the determination condition of S10 corresponds to the stability determination condition; the sensor circuit 3 corresponds to the signal processing circuit; the offset correction circuit 23 corresponds to the ratiometric element; and the switching determination time corresponds to the stability determination time in the claims appended hereto.

(Second Embodiment)

A second embodiment of the present invention will now be described with reference to the drawings. Notably, differences between the second embodiment and the first embodiment will be described. Components identical with those of the first embodiment will be denoted by the same reference numerals.

Figure 3:
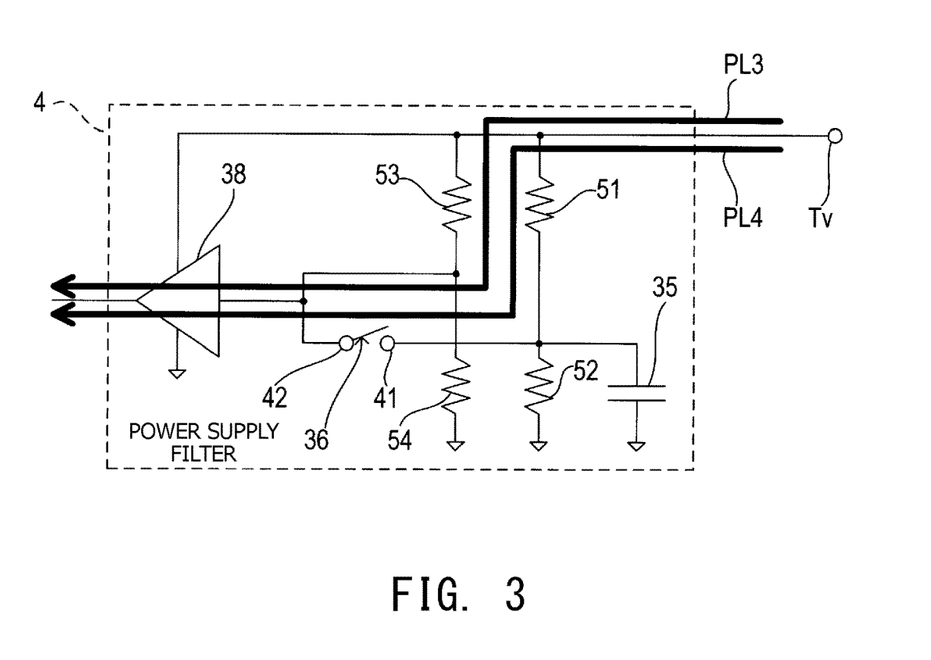
FIG. 3 is a circuit diagram showing the configuration of a power supply filter 4 of a second embodiment.
Figure 4:
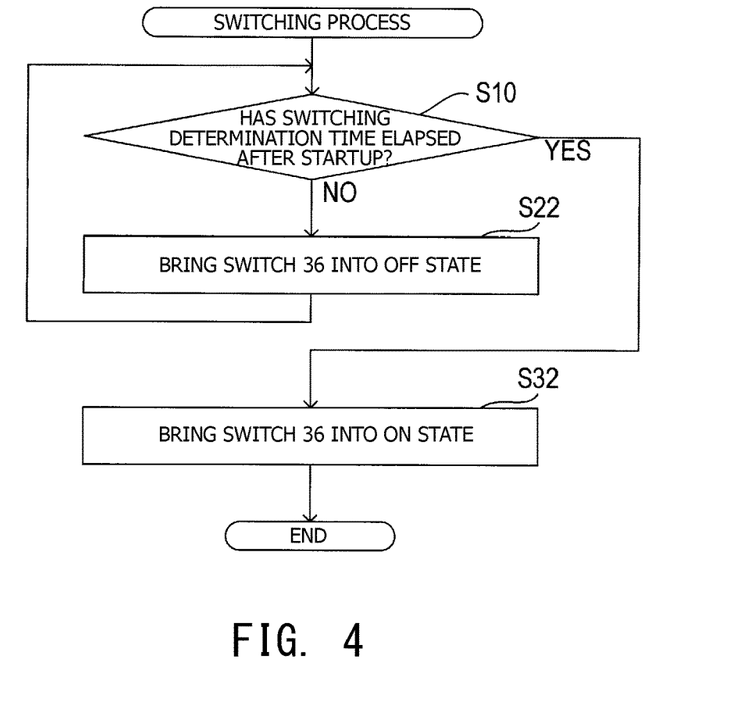
FIG. 4 is a flowchart showing a switching process of the second embodiment.

A sensor module 1 of the second embodiment differs from the sensor module 1 of the first embodiment in that a modified power supply filter 4 and a modified switching process are employed.

As shown in FIG. 3, the power supply filter 4 of the second embodiment includes resistors 51, 52, 53, and 54, a capacitor 35, a switch 36, and a buffer 38.

The resistances of the resistors 51, 52, 53, and 54 of the present embodiment are 100 kΩ, 400 kΩ, 100 kΩ, and 400 kΩ, respectively.

One end of the resistor 51 is connected to the power supply terminal Tv of the sensor module 1, and the other end of the resistor 51 is connected to the resistor 52. An end of the resistor 52, which end is not connected to the resistor 51, is grounded.

One end of the resistor 53 is connected to the power supply terminal Tv, and the other end of the resistor 53 is connected to the resistor 54. An end of the resistor 54, which end is not connected to the resistor 53, is grounded.

One end of the capacitor 35 is connected to the connection point between the resistor 51 and the resistor 52, and the other end of the capacitor 35 is grounded.

The connection terminal 41 of the switch 36 is connected to the connection point between the resistor 51 and the resistor 52, and the connection terminal 42 of the switch 36 is connected to the input terminal of the buffer 38.

The input terminal of the buffer 38 is connected to the switch 36 as described above and is also connected to the connection point between the resistors 53 and 54.

In the power supply filter 4 configured as described above, when the switch 36 is in the OFF state, the sensor drive voltage Vbg is supplied to the sensor device 2 through a supply path PL3 extending from the power supply terminal Tv through the resistor 53 and the buffer 38. The sensor drive voltage Vbg has a voltage value obtained by dividing the power supply voltage Vcc by the resistor 53 and the resistor 54. Since the resistances of the resistors 53 and 54 are 100 kΩ and 400 kΩ, respectively, as described above, the sensor drive voltage Vbg is 4 V.

Meanwhile, in the case where the switch 36 is in the ON state, the sensor drive voltage Vbg is supplied to the sensor device 2 through a supply path PL4 extending from the power supply terminal Tv through the resistor 51, the switch 36, and the buffer 38. Since the resistances of the resistors 51 and 52 are 100 kΩ and 400 kΩ, respectively, as described above, the sensor drive voltage Vbg is 4 V. A low-pass filter formed by the resistor 51 and the capacitor 35 is provided in the supply path PL4. Therefore, the sensor drive voltage Vbg output from the power supply filter 4 through the supply path PL4 has a characteristic determined by the low-pass filter whose cut-off frequency is $1/(2\pi RC)$, where R is the resistance of the resistor 51, and C is the capacitance of the capacitor 35. Also, the response of the sensor drive voltage Vbg, which is output from the power supply filter 4 through the supply path PL4, to a change in the power supply voltage Vcc, is delayed in accordance with the time constant of the low-pass filter formed by the resistor 51 and the capacitor 35.

As shown in FIG. 4, the switching process of the second embodiment differs from that of the first embodiment in that processes of S22 and S32 are executed instead of S20 and S30.

Namely, in the case where the control section 5 determines in S10 that the switching determination time has not yet elapsed, in S22, the control section 5 outputs to the switch 36 the first switching signal for instructing the switch 36 to enter the OFF state, and then proceeds to S10. Meanwhile, in the case where the control section 5 determines in S10 that the switching determination time has elapsed, in S32, the control section 5 outputs to the switch 36 the first switching signal for instructing the switch 36 to enter the ON state, and then ends the switching process.

The power supply filter 4 configured as described above has the supply path PL3 and the supply path PL4. The supply path PL3 supplies the sensor drive voltage Vbg to the sensor device 2. The supply path PL4 is a path different from the supply path PL3 and supplies the sensor drive voltage Vbg to the sensor device 2.

The control section 5 determines whether or not the switching determination time has elapsed after the startup of the microcomputer. In the case where the control section 5 determines that the switching determination time has not yet elapsed, the power supply filter 4 supplies the sensor drive voltage Vbg to the sensor device 2 through the supply path PL3. In the case where the control section 5 determines that the switching determination time has elapsed, the power supply filter 4 supplies the sensor drive voltage Vbg to the sensor device 2 through the supply path PL4.

The response of the sensor drive voltage Vbg to a variation in the power supply voltage Vcc is slower when supplied through the supply path PL4 than through the supply path PL3.

Therefore, the power supply filter 4 and the control section 5 can prevent a decrease in detection accuracy of the sensor device 2 and can prevent a lengthening of the time until the sensor device 2 enters a detection performable state.

Notably, the supply path PL3 corresponds to the first supply path; the supply path PL4 corresponds to the second supply path; S22 corresponds to the process carried out by the first supply section; and S32 corresponds to the process carried out by the second supply section in the claims appended hereto.

(Third Embodiment)

A third embodiment of the present invention will now be described with reference to the drawings. Notably, the differences between the third embodiment and the first embodiment will be described. Components identical with those of the first embodiment will be denoted by the same reference numerals.

Figure 5:
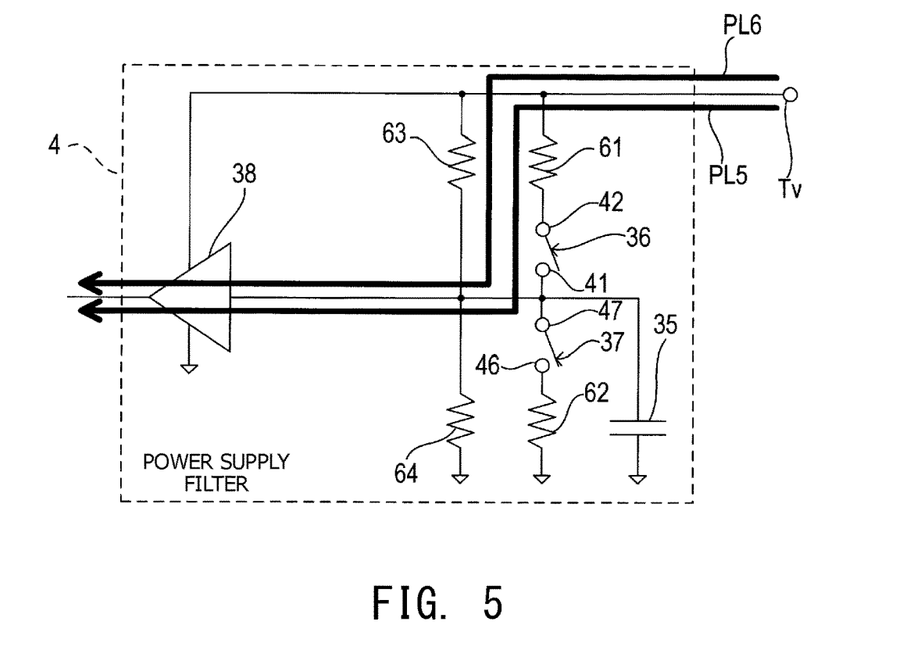
FIG. 5 is a circuit diagram showing the configuration of a power supply filter 4 of a third embodiment.
Figure 6:
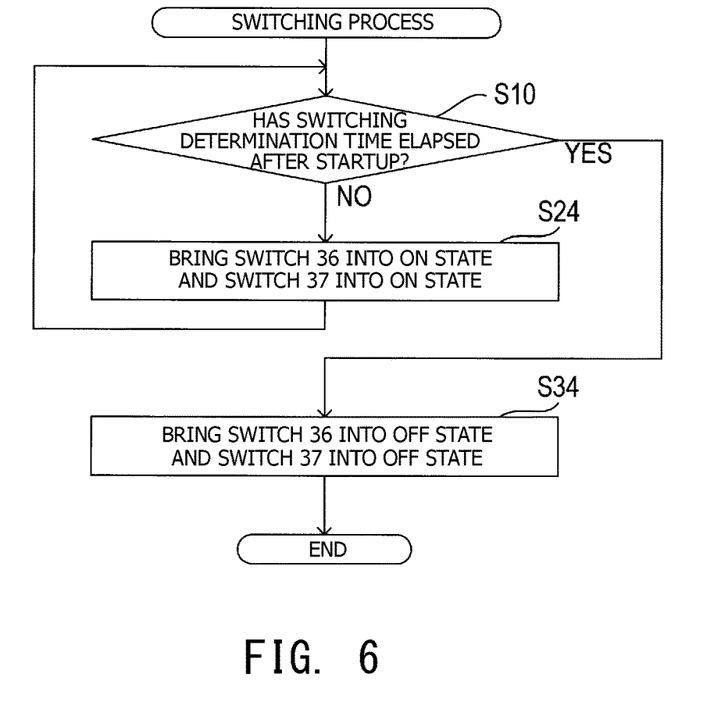
FIG. 6 is a flowchart showing a switching process of the third embodiment.

A sensor module 1 of the third embodiment differs from the sensor module 1 of the first embodiment in that a modified power supply filter 4 and a modified switching process are employed.

As shown in FIG. 5, the power supply filter 4 of the third embodiment includes resistors 61, 62, 63, and 64, a capacitor 35, switches 36 and 37, and a buffer 38.

The resistances of the resistors 61, 62, 63, and 64 of the present embodiment are 500Ω, 2 kΩ, 50 kΩ, and 200 kΩ, respectively.

One end of the resistor 61 is connected to the power supply terminal Tv of the sensor module 1, and the other end of the resistor 61 is connected to the resistor 62 through the switches 36 and 37. An end of the resistor 62, which end is not connected to the resistor 61, is grounded.

One end of the resistor 63 is connected to the power supply terminal Tv, and the other end of the resistor 63 is connected to the resistor 64. An end of the resistor 64, which end is not connected to the resistor 63, is grounded.

One end of the capacitor 35 is connected to the connection point between the resistor 61 and the resistor 62 and to the connection point between the resistor 63 and the resistor 64. The other end of the capacitor 35 is grounded.

The connection terminal 41 of the switch 36 is connected to the connection point between the resistor 61 and the resistor 62, and the connection terminal 42 of the switch 36 is connected to the other end of the resistor 61.

The connection terminal 46 of the switch 37 is connected to one end of the resistor 62, and the connection terminal 47 of the switch 37 is connected the connection point between the resistor 61 and the resistor 62.

The input terminal of the buffer 38 is connected to the connection point between the resistor 61 and the resistor 62 and to the connection point between the resistors 63 and 64.

In the power supply filter 4 configured as described above, when the switch 36 is in the ON state and the switch 37 is in the ON state, the sensor drive voltage Vbg is supplied to the sensor device 2 through a supply path PL5 extending from the power supply terminal Tv through the resistor 61, the switch 36, and the buffer 38. The sensor drive voltage Vbg has a voltage value obtained by dividing the power supply voltage Vcc by the resistor 61 and the resistor 62.

Since the resistances of the resistors 61 and 62 are 500Ω and 2 kΩ, respectively, as described above, the sensor drive voltage Vbg is 4 V.

Meanwhile, in the case where the switch 36 is in the OFF state and the switch 37 is in the OFF state, the sensor drive voltage Vbg is supplied to the sensor device 2 through a supply path PL6 extending from the power supply terminal Tv through the resistor 63 and the buffer 38. Since the resistances of the resistors 63 and 64 are 50 kΩ and 200 kΩ, respectively, as described above, the sensor drive voltage Vbg is 4 V. A low-pass filter formed by the resistor 63 and the capacitor 35 is provided in the supply path PL6. Therefore, the sensor drive voltage Vbg output from the power supply filter 4 through the supply path PL6 has a characteristic determined by the low-pass filter whose cut-off frequency is 1/(2πRC), where R is the resistance of the resistor 63, and C is the capacitance of the capacitor 35. Also, the response of the sensor drive voltage Vbg, which is output from the power supply filter 4 through the supply path PL6, to a change in the power supply voltage Vcc, is delayed in accordance with the time constant of the low-pass filter formed by the resistor 63 and the capacitor 35.

As shown in FIG. 6, the switching process of the third embodiment differs from that of the first embodiment in that processes of S24 and S34 are executed instead of S20 and S30.

Namely, in the case where the control section 5 determines in S10 that the switching determination time has not yet elapsed, in S24, the control section 5 outputs to the switch 36 the first switching signal for instructing the switch 36 to enter the ON state and outputs to the switch 37 the second switching signal for instructing the switch 37 to enter the ON state. Subsequently, the control section 5 proceeds to S10.

Meanwhile, in the case where the control section 5 determines in S10 that the switching determination time has elapsed, in S34, the control section 5 outputs to the switch 36 the first switching signal for instructing the switch 36 to enter the OFF state and outputs to the switch 37 the second switching signal for instructing the switch 37 to enter the OFF state. Subsequently, the control section 5 ends the switching process.

The power supply filter 4 configured as described above has the supply path PL5 and the supply path PL6. The supply path PL5 supplies the sensor drive voltage Vbg to the sensor device 2. The supply path PL6 is a path different from the supply path PL5 and supplies the sensor drive voltage Vbg to the sensor device 2.

The control section 5 determines whether or not the switching determination time has elapsed after startup of the microcomputer. In the case where the control section 5 determines that the switching determination time has not yet elapsed, the power supply filter 4 supplies the sensor drive voltage Vbg to the sensor device 2 through the supply path PL5. In the case where the control section 5 determines that the switching determination time has elapsed, the power supply filter 4 supplies the sensor drive voltage Vbg to the sensor device 2 through the supply path PL6.

The response of the sensor drive voltage Vbg to a variation in the power supply voltage Vcc is slower when supplied through the supply path PL6 than through the supply path PL5.

Therefore, the power supply filter 4 and the control section 5 can prevent a decrease in detection accuracy of the sensor device 2 and can prevent a lengthening of the time until the sensor device 2 enters a detection performable state.

Notably, the supply path PL5 corresponds to the first supply path; the supply path PL6 corresponds to the second supply path; S24 corresponds to the process carried out by the first supply section; and S34 corresponds to the process carried out by the second supply section in the claims appended hereto.

(Fourth Embodiment)

A fourth embodiment of the present invention will now be described with reference to the drawings. Notably, the differences between the fourth embodiment and the first embodiment will be described. Components identical with those of the first embodiment will be denoted by the same reference numerals.

Figure 7:
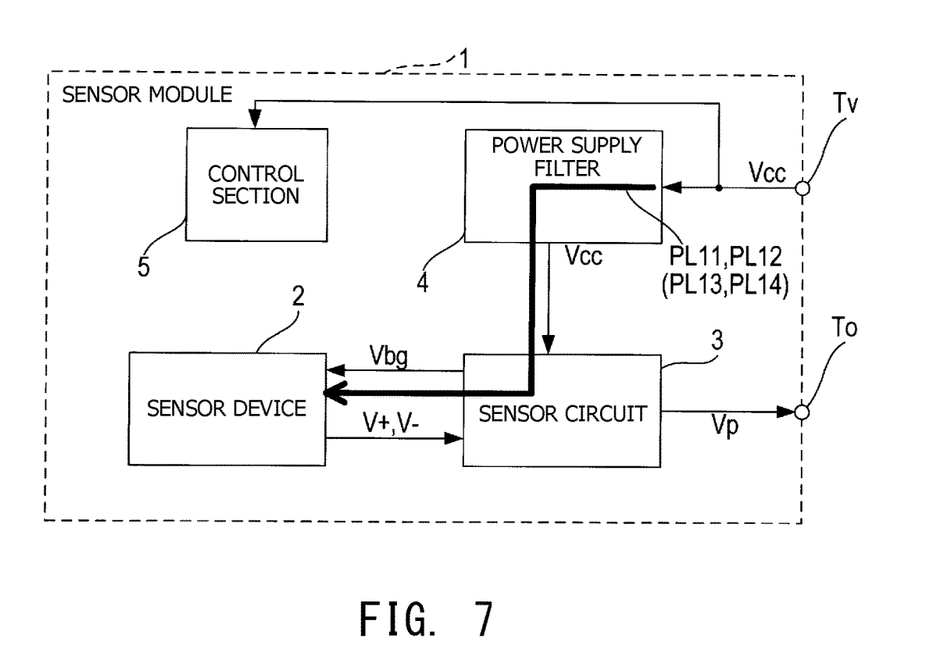
FIG. 7 is a block diagram showing the configuration of a sensor module 1 of a fourth embodiment.

A sensor module 1 of the fourth embodiment differs from the sensor module 1 of the first embodiment in the connection between the sensor device 2 and the sensor circuit 3, the connection between the sensor device 2 and the power supply filter 4, and the connection between the sensor circuit 3 and the power supply filter 4.

Specifically, as shown in FIG. 7, the power supply filter 4 of the fourth embodiment outputs to the sensor circuit 3 the power supply voltage Vcc supplied at the power supply terminal Tv and processed by the power supply filter 4. The sensor circuit 3 of the fourth embodiment operates using the power supply voltage Vcc supplied from the power supply filter 4.

The sensor circuit 3 of the fourth embodiment steps down the power supply voltage Vcc, supplied from the power supply filter 4, in accordance with the following equation (2) using a coefficient k set in advance, and outputs a stepped-down sensor drive voltage Vbg to the sensor device 2.

$$Vbg = k \times Vcc \tag{2}$$

The sensor device 2 of the fourth embodiment operates using the sensor drive voltage Vbg supplied from the sensor circuit 3.

Figure 8:
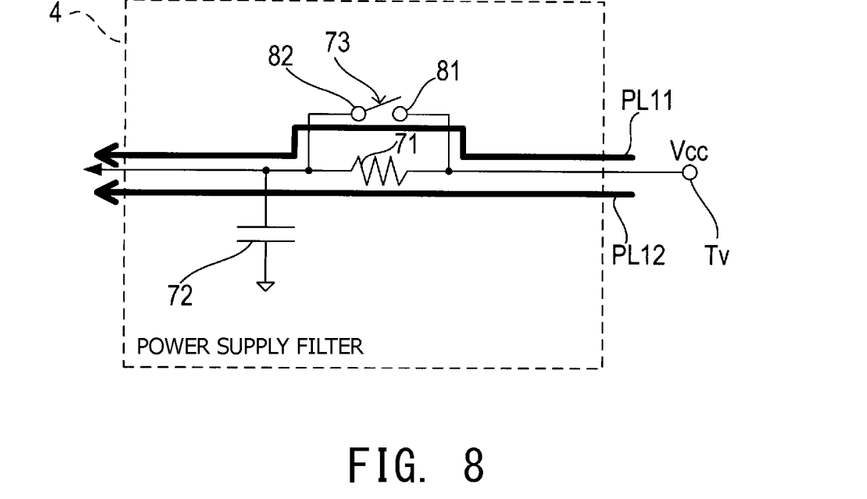
FIG. 8 is a circuit diagram showing the configuration of a power supply filter 4 of the fourth embodiment.
Figure 9:
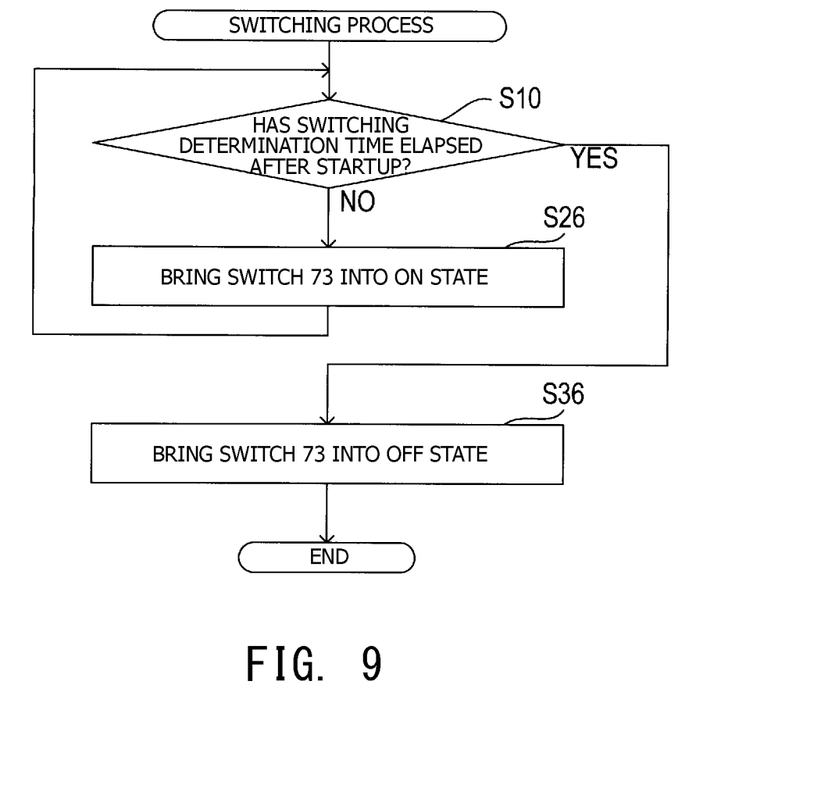
FIG. 9 is a flowchart showing a switching process of the fourth embodiment.

Further, the sensor module 1 of the fourth embodiment differs from the sensor module 1 of the first embodiment in that a modified power supply filter 4 and a modified switching process are employed.

As shown in FIG. 8, the power supply filter 4 of the fourth embodiment includes a resistor 71, a capacitor 72, and a switch 73.

The resistance of the resistor 71 of the present embodiment is 16Ω The capacitance of the capacitor 72 of the present embodiment is 10000 μF.

One end of the resistor 71 is connected to the power supply terminal Tv of the sensor module 1. One end of the capacitor 72 is connected to the other end of the resistor 71, and the other end of the capacitor 72 is grounded.

The switch 73 has connection terminals 81 and 82. The switch 73 is connected in parallel to the resistor 71. Namely, the connection terminal 81 of the switch 73 is connected to one end of the resistor 71, and the connection terminal 82 of the switch 73 is connected to the other end of the resistor 71. In accordance with a switching signal output from the control section 5, the switch 73 is switched to either of an ON state in which the connection terminal 81 and the connection terminal 82 are connected and an OFF state in which the connection terminal 81 and the connection terminal 82 are not connected.

In the sensor module 1 configured as described above, when the switch 73 is in the ON state, as shown in FIGS. 7 and 8, the sensor drive voltage Vbg is supplied to the sensor device 2 through a supply path PL11 which extends from the power supply terminal Tv through the switch 73 and the sensor circuit 3.

Meanwhile, when the switch 73 is in the OFF state, the sensor drive voltage Vbg is supplied to the sensor device 2 through a supply path PL12 which extends from the power supply terminal Tv through the resistor 71 and the sensor circuit 3. A low-pass filter formed by the resistor 71 and the capacitor 72 is provided in the supply path PL12. Therefore, the power supply voltage Vcc output from the power supply filter 4 through the supply path PL12 has a characteristic determined by the low-pass filter whose cut-off frequency is $1/(2\pi RC)$, where R is the resistance of the resistor 71, and C is the capacitance of the capacitor 72. Also, the response of the power supply voltage Vcc, which is output from the power supply filter 4 through the supply path PL12, to a change in the power supply voltage Vcc input from the power supply terminal Tv, is delayed in accordance with the time constant of the low-pass filter formed by the resistor 71 and the capacitor 72.

As shown in FIG. 9, the switching process of the fourth embodiment differs from that of the first embodiment in that processes of S26 and S36 are executed instead of S20 and S30.

Namely, in the case where the control section 5 determines in S10 that the switching determination time has not yet elapsed, in S26, the control section 5 outputs to the switch 73 a third switching signal for instructing the switch 73 to enter the ON state, and then proceeds to S10. Meanwhile, in the case where the control section 5 determines in S10 that the switching determination time has elapsed, in S36, the control section 5 outputs to the switch 73 the third switching signal for instructing the switch 73 to enter the OFF state, and ends the switching process.

The sensor circuit 3, the power supply filter 4, and the control section 5, which are configured as described above, supply the sensor drive voltage Vbg to the sensor device 2.

The sensor circuit 3 and the power supply filter 4 have the supply path PL11 and the supply path PL12. The supply path PL11 supplies the sensor drive voltage Vbg to the sensor device 2. The supply path PL12 is a path different from the supply path PL11 and supplies the sensor drive voltage Vbg to the sensor device 2.

The control section 5 determines whether or not the switching determination time has elapsed after startup of the microcomputer. In the case where the control section 5 determines that the switching determination time has not yet elapsed, the sensor circuit 3 and the power supply filter 4 supply the sensor drive voltage Vbg to the sensor device 2 through the supply path PL11. In the case where the control section 5 determines that the switching determination time has elapsed, the sensor circuit 3 and the power supply filter 4 supply the sensor drive voltage Vbg to the sensor device 2 through the supply path PL12.

The response of the sensor drive voltage Vbg to a variation in the power supply voltage Vcc is slower when supplied through the supply path PL12 than through the supply path PL11.

As described above, the sensor circuit 3, the power supply filter 4, and the control section 5 supply the sensor drive voltage Vbg to the sensor device 2 through the supply path PL11 in a situation where supply of the sensor drive voltage Vbg to the sensor device 2 is unstable, for example, immediately after supply of the sensor drive voltage Vbg to the sensor device 2 has been started. The response of the sensor drive voltage Vbg to a variation in the power supply voltage Vcc is faster when supplied through the supply path PL11 than through the supply path PL12. Therefore, the sensor circuit 3, the power supply filter 4, and the control section 5 can prevent the occurrence of a situation where supply of the sensor drive voltage Vbg to the sensor device 2 is delayed immediately after supply of the sensor drive voltage Vbg to the sensor device 2 has been started, to thereby prevent a lengthening of the time until detection by the sensor device 2 becomes possible.

Further, the sensor circuit 3, the power supply filter 4, and the control section 5 supply the sensor drive voltage Vbg to the sensor device 2 through the supply path PL12 in a situation where supply of the sensor drive voltage Vbg to the sensor device 2 is stable. The response of the sensor drive voltage Vbg to a variation in the power supply voltage Vcc is slower when supplied through the supply path PL12 than through the supply path PL11. Therefore, in the case where noise enters the supply path PL12, the sensor circuit 3, the power supply filter 4, and the control section 5 can prevent superimposition of the noise on the sensor drive voltage Vbg supplied to the sensor device 2, thereby preventing a decrease in detection accuracy of the sensor device 2.

As described above, the sensor circuit 3, the power supply filter 4, and the control section 5 can prevent a decrease in detection accuracy of the sensor device 2 and can prevent a lengthening of the time until the sensor device 2 enters a detection performable state.

Notably, the sensor circuit 3, the power supply filter 4, and the control section 5 correspond to the voltage supply apparatus; the supply path PL11 corresponds to the first supply path; and the supply path PL12 corresponds to the second supply path in the claims appended hereto.

Also, S26 corresponds to the process carried out by the first supply section in the claims; and S36 corresponds to the process carried out by the second supply section in the claims appended hereto.

(Fifth Embodiment)

A fifth embodiment of the present invention will now be described with reference to the drawings. Notably, the differences between the fifth embodiment and the fourth embodiment will be described. Components identical with those of the fourth embodiment will be denoted by the same reference numerals.

Figure 10:
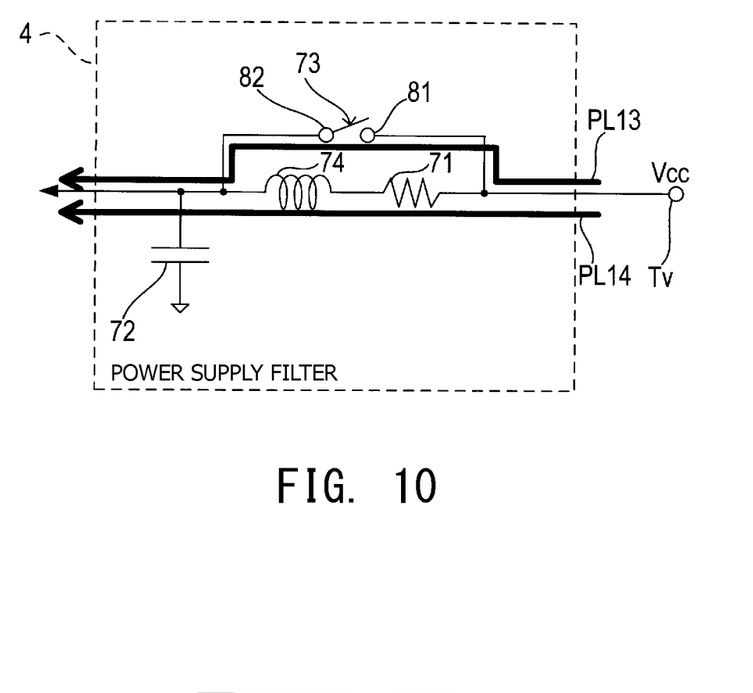
FIG. 10 is a circuit diagram showing the configuration of a power supply filter 4 of a fifth embodiment.

A sensor module 1 of the fifth embodiment differs from the sensor module 1 of the fourth embodiment in that a modified power supply filter 4 is employed.

As shown in FIG. 10, the power supply filter 4 of the fifth embodiment includes a resistor 71, a capacitor 72, a switch 73, and a coil 74.

One end of the resistor 71 is connected to the power supply terminal Tv of the sensor module 1. The coil 74 is connected in series with the resistor 71. Namely, one end of the coil 74 is connected to the other end of the resistor 71. The inductance of the coil 74 of the present embodiment is 220 µH.

One end of the capacitor 72 is connected to the other end of the coil 74, and the other end of the capacitor 72 is grounded.

The switch 73 is connected in parallel to the resistor 71 and the coil 74. Namely, the connection terminal 81 of the switch 73 is connected to the one end of the resistor 71, and the connection terminal 82 of the switch 73 is connected to the other end of the coil 74.

In the sensor module 1 configured as described above, when the switch 73 is in the ON state, as shown in FIGS. 7 and 10, the sensor drive voltage Vbg is supplied to the sensor device 2 through a supply path PL13 which extends from the power supply terminal Tv through the switch 73 and the sensor circuit 3.

Meanwhile, when the switch 73 is in the OFF state, the sensor drive voltage Vbg is supplied to the sensor device 2 through a supply path PL14 which extends from the power supply terminal Tv through the resistor 71, the coil 74, and the sensor circuit 3. A low-pass filter formed by the capacitor 72 and the coil 74 is provided in the supply path PL14. Therefore, the power supply voltage Vcc output from the power supply filter 4 through the supply path PL14 has a characteristic determined by the low-pass filter whose cut-off frequency is $1/\{2\pi(LC)^{1/2}\}$, where C is the capacitance of the capacitor 72, and L is the inductance of the coil 74. Also, the response of the power supply voltage Vcc, which is output from the power supply filter 4 through the supply path PL14, to a change in the power supply voltage Vcc input from the power supply terminal Tv, is delayed in accordance with the time constant of the low-pass filter formed by the capacitor 72 and the coil 74.

The sensor circuit 3, the power supply filter 4, and the control section 5, which are configured as described above, supply the sensor drive voltage Vbg to the sensor device 2.

The sensor circuit 3 and the power supply filter 4 include the supply path PL13 and the supply path PL14. The supply path PL13 supplies the sensor drive voltage Vbg to the sensor device 2. The supply path PL14 is a path different from the supply path PL13 and supplies the sensor drive voltage Vbg to the sensor device 2.

In the case where the control section 5 determines that the switching determination time has not yet elapsed, the sensor circuit 3 and the power supply filter 4 supply the sensor drive voltage Vbg to the sensor device 2 through the supply path PL13. In the case where the control section 5 determines that the switching determination time has elapsed, the sensor circuit 3 and the power supply filter 4 supply the sensor drive voltage Vbg to the sensor device 2 through the supply path PL14.

The response of the sensor drive voltage Vbg to a variation in the input power supply voltage Vcc is slower when supplied through the supply path PL14 than through the supply path PL13.

Therefore, the sensor circuit 3, the power supply filter 4, and the control section 5 can prevent a decrease in detection accuracy of the sensor device 2 and can prevent a lengthening of the time until the sensor device 2 enters a detection performable state.

Notably, the supply path PL13 corresponds to the first supply path; and the supply path PL14 corresponds to the second supply path.

(Sixth Embodiment)

A sixth embodiment of the present invention will now be described with reference to the drawings. Notably, differences between the sixth embodiment and the first embodiment will be described. Components identical with those of the first embodiment will be denoted by the same reference numerals.

Figure 11:
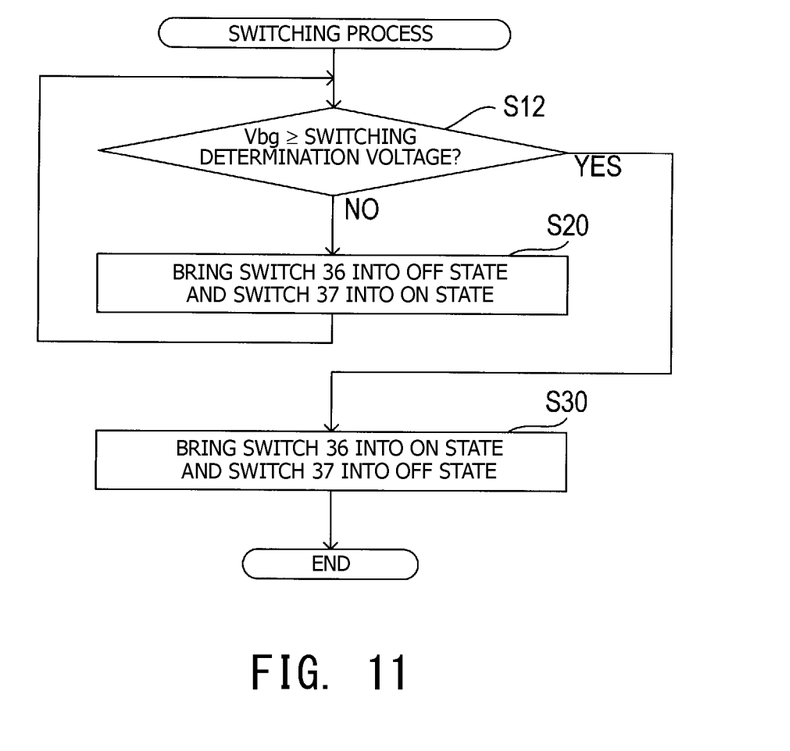
FIG. 11 is a flowchart showing a switching process of a sixth embodiment.

A sensor module 1 of the sixth embodiment differs from the sensor module 1 of the first embodiment in that the sensor drive voltage Vbg output from the power supply filter 4 is input to the control section 5, and a modified switching process is employed.

As shown in FIG. 11, the switching process of the sixth embodiment differs from that of the first embodiment in that a process S12 is executed instead of S10.

Namely, when the switching process is executed, the control section 5 first determines in S12 whether or not the sensor drive voltage Vbg is equal to or greater than a switching determination voltage (for example, 3.5 V) set in advance. In the case where the control section 5 determines that the sensor drive voltage Vbg is less than the switching determination voltage, the control section 5 proceeds to S20.

Meanwhile, in the case where the control section 5 determines that the sensor drive voltage Vbg is equal to or greater than the switching determination voltage, the control section 5 proceeds to S30.

The power supply filter 4 and the control section 5 which are configured as described above can determine whether or not the supply of the sensor drive voltage Vbg to the sensor device 2 is stable by a simple method of determining whether or not the sensor drive voltage Vbg is equal to or greater than the switching determination voltage. Therefore, the processing load of the control section 5 can be reduced.

Notably, S12 corresponds to the process carried out by the stability determination section, and the switching determination voltage corresponds to the stability determination voltage.

The embodiments of the present disclosure have been described above, but the present disclosure is not limited to the above embodiments and can be embodied in various other forms.

For example, in the above embodiments, the sensor device 2 is shown as a circuit for temperature detection. However, the present invention is not limited to a circuit for temperature detection, and may be applied to any detection circuit so long as the detection circuit has a ratiometric characteristic. For example, the sensor device may be a sensor device in which a Wheatstone bridge circuit is formed through use of strain resistors instead of the heat-sensitive resistor 11, the first fixed resistor 12, the second fixed resistor 13, and the third fixed resistor 14.

In the above-described embodiments, the sensor drive voltage Vbg is supplied from the power supply filter 4 to the sensor device 2. However, the various embodiments may be modified such that the sensor drive voltage Vbg output from the power supply filter 4 is converted to a constant current, and the constant current is supplied to the sensor device 2.

The function of one component in the above embodiments may be distributed to a plurality of components, or the functions of a plurality of components may be realized by one component. Part of the configurations of the above embodiments may be omitted. At least part of the configuration of each of the above embodiments may be added to or partially replace the configurations of other embodiments.

The present disclosure may be realized in various forms other than the above-described power supply filter 4 and control section 5. For example, the present disclosure may be realized as a system including the power supply filter 4 and the control section 5 as components, a program for causing a computer to function as the power supply filter 4 and the control section 5, a non-transitory tangible recording medium, e.g., a semiconductor memory, in which the program is recorded, and a voltage supply method.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2017-057329 filed Mar. 23, 2017, the disclosure of which is incorporated herein by reference in its entirety.

What is claimed is:

1. A voltage supply apparatus for supplying a voltage to a detection circuit, the detection circuit detecting a state quantity to be detected and outputting, as a detection signal, a signal having a voltage corresponding to the detected state quantity, the detection circuit having a ratiometric characteristic such that the voltage of the detection signal varies in proportion to a drive voltage supplied to the detection circuit so as to drive the detection circuit, the voltage supply apparatus comprising:

a first supply path which supplies the drive voltage to the detection circuit;

a second supply path which is a path different from the first supply path and which supplies the drive voltage to the detection circuit;

a stability determination section which determines whether or not a stability determination condition is satisfied, the stability determination condition being set in advance and when satisfied indicating that supply of the drive voltage to the detection circuit is stable;

a first supply section which supplies the drive voltage to the detection circuit through the first supply path when the stability determination section determines that the stability determination condition is not satisfied but not when the stability determination condition is satisfied; and a second supply section which supplies the drive voltage to the detection circuit through the second supply path when the stability determination section determines that the stability determination condition is satisfied but not when the stability determination condition is not satisfied, wherein a response of the drive voltage to a voltage variation is slower when supplied through the second supply path than through the first supply path.

2. The voltage supply apparatus as claimed in claim 1, comprising a plurality of components which constitute a signal processing circuit for processing the detection signal output from the detection circuit, wherein one of the plurality of components which outputs a signal whose voltage varies in proportion to the drive voltage has a ratiometric element, and the first supply path and the second supply path are connected to the ratiometric element;

the first supply section supplies the drive voltage to the ratiometric element through the first supply path when the stability determination section determines that the stability determination condition is not satisfied; and the second supply section supplies the drive voltage to the ratiometric element through the second supply path when the stability determination section determines that the stability determination condition is satisfied.

3. The voltage supply apparatus as claimed in claim 1, wherein the stability determination condition is an elapse of a previously set stability determination time after startup of the voltage supply apparatus.

4. The voltage supply apparatus as claimed in claim 1, wherein the stability determination condition is a condition wherein the drive voltage is equal to or greater than a previously set stability determination voltage.

\* \* \* \* \*